United States Patent
Sakarda (10) Patent No.: US 9,213,401 B2
(45) Date of Patent: Dec. 15, 2015

(54) ZERO POWER HIBERNATION MODE WITH INSTANT ON

(75) Inventor: Premanand Sakarda, Acton, MA (US)

(73) Assignee: MARVELL WORLD TRADE LTD. (BB)

( * ) Notice: Subject to any disclaimer, the term of this patent is extended or adjusted under 35 U.S.C. 154(b) by 509 days.

(21) Appl. No.: 13/533,088

(22) Filed: Jun. 26, 2012

(65) Prior Publication Data

US 2013/0031388 A1   Jan. 31, 2013

Related U.S. Application Data

(60) Provisional application No. 61/511,844, filed on Jul. 26, 2011.

(51) Int. Cl.
*G06F 1/32* (2006.01)
*G06F 9/44* (2006.01)

(52) U.S. Cl.
CPC ............ *G06F 1/3287* (2013.01); *G06F 1/3203* (2013.01); *G06F 9/4418* (2013.01); *Y02B 60/1282* (2013.01); *Y02B 60/186* (2013.01)

(58) Field of Classification Search
CPC ........ G06F 1/3287; G06F 9/4418; G06F 1/32
USPC ....................................................... 713/320
See application file for complete search history.

(56) References Cited

U.S. PATENT DOCUMENTS

| | | | |
|---|---|---|---|
| 5,423,045 A * | 6/1995 | Kannan et al. ................ | 713/322 |
| 5,920,728 A | 7/1999 | Hallowell et al. | |
| 6,542,996 B1 * | 4/2003 | Chang et al. .................. | 713/300 |
| 7,774,626 B2 * | 8/2010 | Fleming ......................... | 713/300 |
| 7,797,563 B1 * | 9/2010 | Moll et al. ..................... | 713/324 |
| 7,953,993 B2 | 5/2011 | Allarey et al. | |
| 2007/0157036 A1 * | 7/2007 | Jahagirdar et al. ............ | 713/300 |
| 2008/0065917 A1 | 3/2008 | Suzukawa | |
| 2008/0082845 A1 | 4/2008 | Morisawa | |
| 2008/0184050 A1 | 7/2008 | Yamaji et al. | |
| 2009/0119527 A1 | 5/2009 | Kim | |
| 2009/0217070 A1 * | 8/2009 | Kurts et al. ................... | 713/322 |
| 2009/0235099 A1 * | 9/2009 | Branover et al. ............. | 713/322 |
| 2011/0107020 A1 | 5/2011 | Duan | |
| 2011/0249471 A1 * | 10/2011 | Costa .............................. | 363/13 |
| 2012/0072750 A1 * | 3/2012 | Jahagirdar et al. ............ | 713/322 |

OTHER PUBLICATIONS

Patent Cooperation Treaty (PCT) International Search Report and Written Opinion issued in co-pending PCT International Application No. PCT/US2012/044167 (International Filing Date: Jun. 26, 2012) having a date of mailing of Aug. 30, 2012 (12 pgs).

* cited by examiner

*Primary Examiner* — Thomas Lee
*Assistant Examiner* — Volvick Derose (57) ABSTRACT

Systems, methods, and other embodiments associated with a processor configured with a zero power hibernation/sleep mode during which the processor consumes no power are described. According to one embodiment, a processor includes a power management logic. The power management logic is configured to receive a control signal requesting the processor to transition into a power saving mode that reduces power to the processor while retaining a current state of the processor. The power management logic is configured to store, in response to the control signal, a current state of components of the processor in a non-volatile memory. The power management logic is configured to adjust power to the processor to a zero power mode to place the processor into the power saving mode, wherein during the zero power mode the processor is receiving no power.

20 Claims, 4 Drawing Sheets

ZERO POWER HIBERNATION MODE WITH INSTANT ON

CROSS REFERENCE TO RELATED APPLICATIONS

This patent disclosure claims the benefit of U.S. Provisional Application No. 61/511,844 filed on Jul. 26, 2011, which is hereby wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Computing devices are constantly evolving to provide users with better performance. These technological changes are especially prevalent in mobile computing devices such as smartphones, laptops, and tablet computers. However, since mobile devices use batteries for power, performance must be balanced with power consumption. This is especially challenging considering the tradeoff between increased battery life and lightweight design and profile.

Thus, power consumption is an important consideration for mobile devices that use batteries. To address power consumption concerns certain components in mobile devices may be placed into a low power mode to prolong battery life when idle. However, even in a low power mode the device still consumes power to maintain information in a ready state so that powering back to an operational mode is quick. Accordingly, while in a low power mode the device still draws power from the battery causing reduced battery life.

SUMMARY

In one embodiment a processor includes a power management logic. The power management logic is configured to receive a control signal requesting the processor to transition into a power saving mode that reduces power to the processor while retaining a current state of the processor. The power management logic is configured to store, in response to the control signal, a current state of components of the processor in a non-volatile memory. The power management logic is configured to adjust power to the processor to a zero power mode to place the processor into the power saving mode, wherein during the zero power mode the processor is receiving no power.

In another embodiment, the power management logic is configured to store a current state for each of a real-time clock (RTC) and an operating system timer (OST) of the processor by capturing values from registers in the processor and storing the values in the non-volatile memory.

In another embodiment, the power management logic is configured to control a volatile memory to initiate a self-refresh mode prior to adjusting the power in order to maintain data stored in the volatile memory while the processor is in the power saving mode.

In another embodiment, the processor is powered by a core voltage. The power management logic is configured to adjust the power of the processor by reducing the core voltage of the processor during the zero power mode to zero volts. The processor consumes zero power in the zero power mode. The power management logic is configured to transition the processor into an on mode from the zero power mode in less than ten milliseconds. The power management logic is configured to transition the processor into the zero power mode from the on mode in less than ten milliseconds.

In another embodiment, the power management logic is further configured to receive a wakeup signal to change a power mode of the processor to an on mode, determine, in response to the wakeup signal, whether the processor is in the power saving mode or an off mode, and to restore the processor to the on mode if in the power saving mode by adjusting the stored current state of the components in the non-volatile memory to generate an updated state, and updating one or more registers in the processor with the updated state.

In another embodiment, the power management logic is configured to restore the processor to the on mode by re-establishing power to the processor. Adjusting the stored current state includes using a value of a real-time clock of a power management integrated circuit (PMIC) to update the stored current state to the updated state.

In another embodiment, the power management logic is configured to control, in response to the wakeup signal, a volatile memory to transition from a self-refresh mode to an operating mode and to restore operating system information to the processor using a pointer to a location in the volatile memory.

In one embodiment, a method includes receiving, in a processor, a control signal requesting the processor to transition into a power saving mode that reduces power to the processor while retaining a current state of the processor. The method includes storing, in response to the control signal, a current state of components of the processor in a non-volatile memory. The method includes adjusting power to the processor to a zero power mode to place the processor into the power saving mode, wherein during the zero power mode the processor is receiving no power.

In one embodiment, an integrated circuit includes power management logic configured to control a processor to transition into a power saving mode that reduces power to the processor while retaining a current state of the processor. The power management logic is configured to control the processor by saving a current state of the processor to a non-volatile memory. The power management logic is configured to control the processor by reducing power to the processor to place the processor into the power saving mode. During the power saving mode the processor is consuming no power.

BRIEF DESCRIPTION OF THE DRAWINGS

The accompanying drawings, which are incorporated in and constitute a part of the specification, illustrate various systems, methods, and other embodiments of the disclosure. The illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Described herein are examples of systems, methods, and other embodiments associated with a processor configured with a zero power hibernation/sleep mode during which the processor consumes no power. In one embodiment, components in a processor that typically consume power during a low power mode are powered off. Accordingly, a core voltage of the processor can be reduced to zero instead of supplying the processor with a reduced voltage during hibernation and sleep modes. A current state for the components in the processor that typically receive power during hibernate and sleep modes is saved to memory before the power is turned off. In this way, voltage to the processor can be reduced to zero while saving the current state of the processor and retaining the ability to quickly return to an on mode.

Figure 1:
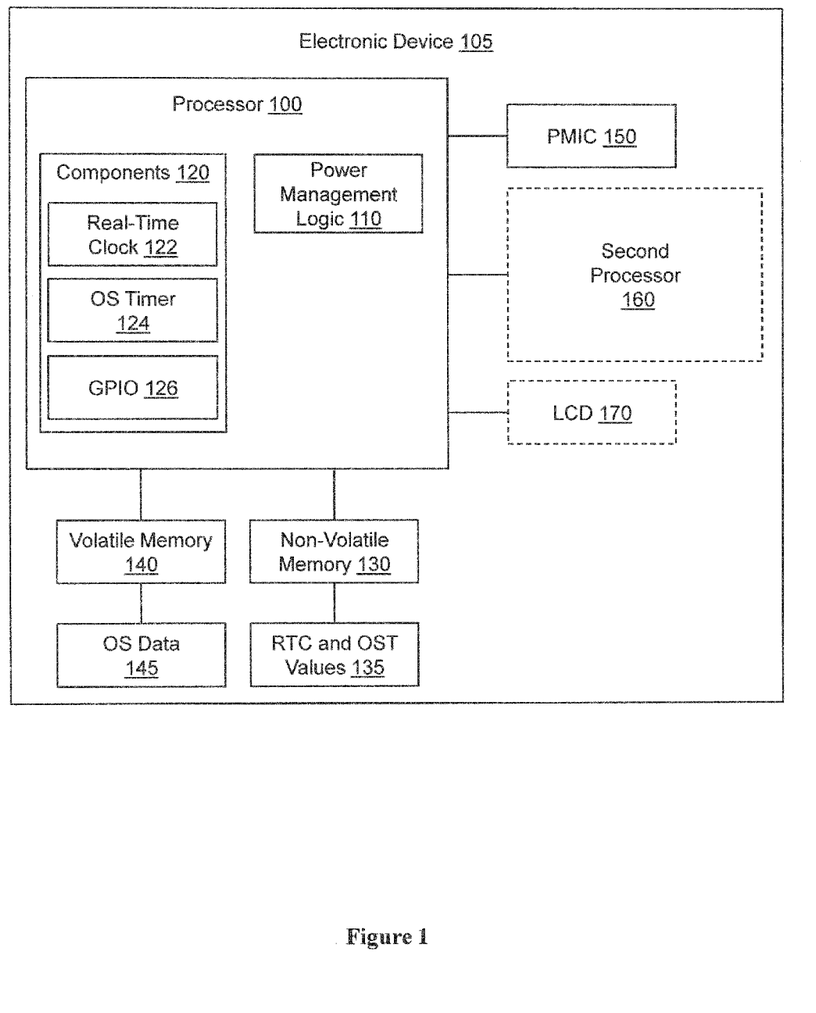
FIG. 1 illustrates one embodiment of a processor associated with a zero power hibernate mode.

With reference to FIG. 1, one embodiment of a processor 100 is shown that is associated with a zero power hibernation/sleep mode. The processor 100 is implemented to operate in an electronic device 105 that includes a second processor 160 (e.g., cellular processor), and a display 170 (e.g., liquid crystal display LCD 170). The electronic device 105 is, for example, a smartphone, a tablet computer, a laptop computer, a cellular telephone, a personal digital assistant, a portable music player, and so on.

In one embodiment, the electronic device 105 includes a power management integrated circuit (PMIC) 150 that includes a real-time clock (not shown). The PMIC 150 is configured to manage power to various components in the electronic device 105 such as the processor 100, non-volatile memory 130, and volatile memory 140. The PMIC 150 manages power to components in the electronic device 105 by, for example, regulating voltage to components, supplying power upon a request from a component, changing a power level upon receiving a power on or off request, and so on. The PMIC 150 includes, for example, one or more components that are always powered on. The always-on components of the PMIC 150 include a real-time clock (RTC) of the PMIC, an interrupt, and so on. In this way, the PMIC 150 can maintain an updated time using the RTC that is always on even though other components of the electronic device 105 are powered off.

The processor 100 includes multiple components 120. The components 120 include, for example, a real-time clock (RTC) 122, an operating system (OS) timer 124, and a general purpose input/output (GPIO) 126. The components 120 are an example of components that are typically part of an always-on domain of the processor. The always-on components are components that even though the processor 100 may be powered off still receive power to maintain information. However, in processor 100, the components 120 are configured to be powered off when the processor 100 is in hibernate or sleep mode as described below.

In one embodiment, GPIO 126 (general purpose input/output) is configured as an interrupt for the PMIC 150 or other components in the electronic device 105 to communicate with the processor 100. Accordingly, the PMIC 150 can provide control signals to the GPIO 126 which in turn cause the processor 100 to enter a hibernate mode, a sleep mode, an on mode, or an off mode. Hibernate mode and sleep mode are powering saving modes for the processor 100. In hibernate mode and in sleep mode, the processor 100 is powered off.

Thus, both the sleep mode and the hibernate mode are zero power modes where the process 100 is not receiving power. However, hibernate mode may also include powering off additional components of electronic device 105 that are not powered off during sleep mode. In one example, hibernate mode includes powering off volatile memory 140, whereas sleep mode does not include powering off the volatile memory 140. Hibernate mode may also include powering off the second processor 160 and the non-volatile memory 130. Accordingly, during sleep mode the volatile memory 140 is maintained in a powered on mode or a self-refresh mode. Furthermore, the processor 100 also includes an on-mode and an off mode. The on-mode is the operating mode for the electronic device 105 when the processor 100 and all associated components are receiving power at an operating level. In the off mode, the processor 100 and the electronic device 105 receive no power and state information for the processor 100 is not saved. Thus, when transitioning from the off mode to the on mode, the electronic device 105 is initialized by, for example, loading an operating system to the processor 100 and volatile memory 140, initializing the LCD 170, and so on.

In one embodiment, when switched into the hibernate or sleep mode, the processor 100 is configured to consume no power. For example, prior to entering the hibernate mode, the processor 100 saves current state information of the components 120. Upon receiving a control signal to wakeup, the processor 100 resumes processing as though never powered off by using the previously saved state information after the state information is restored from memory. In this way, the processor 100 can be temporarily suspended from operating and power can be conserved while still allowing for a quick restart without performing a full power off and boot up of the processor 100.

The RTC 122 and OS timer 124 are one example of components that are powered off during hibernate and sleep modes. In one example, the power management logic 110 saves values of registers in the processor 100 that correspond with the RTC 122 and the OST 124. The power management logic 110 saves values from the registers to the non-volatile memory 130 when the processor 100 is preparing to enter hibernate mode as RTC and OST values 135. The RTC 122 is configured to track the current time of day (e.g., hours, minutes, and seconds) for the processor 100. Thus, powering off the RTC 122 without saving a current value of the RTC 122 would result in losing the current time of day information for the processor 100. In one embodiment, the RTC 122 is an oscillator that continuously updates a register in the processor 100 in order to track the current time.

The OST 124 is a timer for the operating system that is configured to operate with an operating system scheduler to schedule processes for execution in the processor 100. Thus, powering off the OST 124 without saving values of the associated register(s) would interfere with scheduling operating system processes after the processor 100 is restored from the hibernate mode. Accordingly, the values of the OST 124 and the RTC 122 are saved in order to power off the OST 124 and the RTC 122 during the hibernate and sleep modes.

For example, consider where a user of the electronic device 105 has several different applications running on the processor 100. Further consider that the user needs to temporarily stop using the electronic device 105 but wishes to later resume use of the applications from the current point of use. In this example, to maintain the current state of the applications and processor 100 the user may leave the processor 100 in an on mode where it continues to draw power at a normal operational level and will consume valuable battery life. By contrast, turning off the electronic device 105 will put the processor 100 to an off mode, which saves substantial power. But turning off the device 105 is time consuming and results in the user being required to save all data prior to powering off and then reopen the applications after a lengthy reboot, which may be inconvenient. Alternately, the processor 100 may be switched into a hibernate or sleep mode from which use resumes quickly when desired and battery life is conserved.

In one embodiment, the hibernate mode is initiated by the user pushing a button on the electronic device 105 that sends a control signal to the processor 100 requesting the processor 100 to switch to the hibernate mode. In response to the control signal, the processor 100 is configured to initiate the process of entering the hibernate mode. The control signal is a communication requesting the processor 100 to enter the zero power hibernate mode. It should be noted that in other embodiments, the control signal may be initiated by a software routine which detects a period of inactivity on the electronic device 105. In other embodiments, the PMIC 150 mediates reception of the control signal from a process or the user and relays relevant portions to the processor 100. The control signal can also be a request to enter a sleep mode which, depending on the device, may place more components or fewer components (e.g., Volatile memory 140, second processor 160, LCD 170) associated with the processor 100 into a low power or off mode.

In one embodiment, the power management logic 110 is configured to receive the control signal requesting hibernate or sleep mode. In response to the control signal the power management logic 110 causes the processor 100 to capture a current context of the processor 100 and values, for example, of registers for the RTC 122, the OST 124, and the GPIO 126. The processor 100 then stores the values and context in the non-volatile memory 130.

In one embodiment, the power management logic 110 performs a callback to device drivers running on the processor 100. The callback is a request to the device drivers to, for example, perform an action so that processor 100 can be switched into hibernate mode. In response to the callback, the device drivers save all current context information to the volatile memory 140 or the non-volatile memory 130. In one example, depending on a requested mode from the control signal (e.g., hibernate or sleep) the device drivers save the current context information to non-volatile memory 130 since during the sleep mode the volatile memory 140 may be powered off and thus will not retain information. The non-volatile memory 130 is, for example, a flash memory or other memory that retains data when powered off. The non-volatile memory 130 may also be powered off when the processor 100 is in hibernate mode or sleep mode.

Since the non-volatile memory 130 retains data when powered off, the values stored in the non-volatile memory 130 will not be lost. Thus, when the processor 100 receives a control signal to enter a hibernate mode, values in a register for the RTC 122 are saved to non-volatile memory 130 to preserve the current state of the RTC 122. In contrast to the non-volatile memory 130, the volatile memory 140 does not retain data when powered off. However, depending on the requested mode the volatile memory 140 may not be powered off. The volatile memory 140 stores operating system (OS) data 145 which the processor 100 uses when operating. Thus, to maintain the ability of the processor 100 to restart quickly after recovering from the hibernate mode, the OS data 145 should be saved. Accordingly, in one embodiment, the power management logic 110 is configured to cause the processor 100 to place the volatile memory 140 into a self-refresh mode. The self-refresh mode is a mode where the volatile memory 140 is powered on but self-sufficient and refreshes to maintain the stored data without control from the processor 100. During the self-refresh mode, a controller for the volatile memory 140 in the processor is powered down to save power.

Once the current state of the processor 100 is saved, the power to the processor 100 is reduced to zero to place the processor 100 into the hibernate mode. To reduce the power to zero, the processor 100, for example, sends a signal to the PMIC 150 requesting the PMIC 150 to eliminate a voltage to the processor 100. In response to the signal, the PMIC 150 reduces the core voltage to the processor to zero, thus placing the processor 100 in the hibernate mode. When the processor 100 is in the hibernate mode all components of the processor 100 are without power. In some processors, a hibernate mode still includes supplying power to, for example, the components 120 or some other portion of the processor that is preserving a specific functionality. However, in this example, neither the processor 100, nor any components 120 of the processor are receiving power. In hibernate and sleep modes, all portions of processor 100 are completely powered off and receiving no power.

Additionally, in one embodiment, the power management logic 110 is configured to transition the processor 100 into an on mode from the zero power mode in less than ten milliseconds. Additionally, the power management logic 110 is configured to transition the processor 100 into the zero power mode from the on mode in less than ten milliseconds. In this way, the power management logic 110 provides low-latency transitions when switching modes of the processor 100. Accordingly, power is conserved and processing can be quickly resumed.

Figure 2:
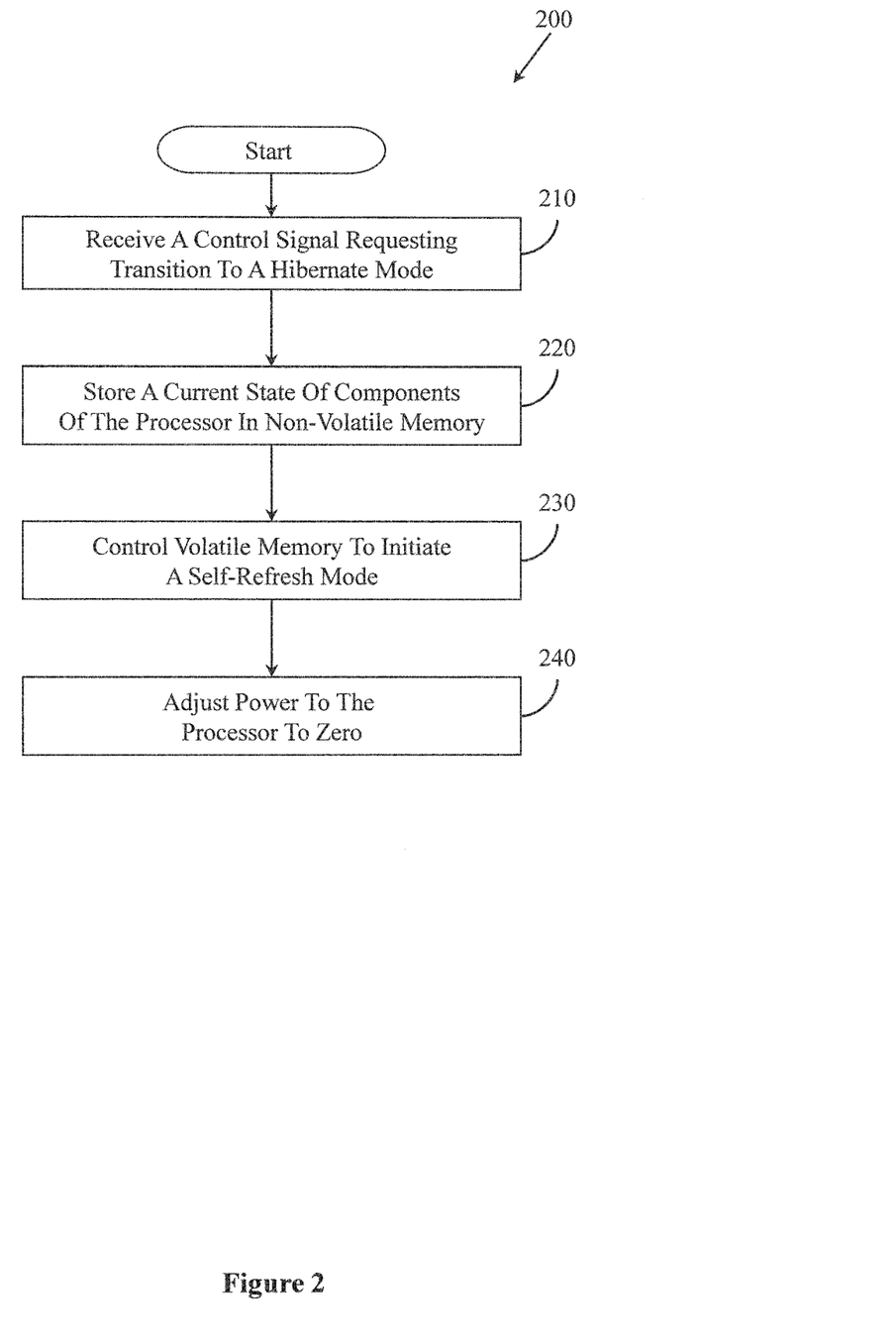
FIG. 2 illustrates one embodiment of a method associated with transitioning a processor into a zero power hibernate mode.

Further details of the zero power hibernate/sleep modes and the processor 100 will be discussed in conjunction with FIGS. 2 and 3. FIG. 2 illustrates one embodiment of a method 200 associated with transitioning a processor into a zero power hibernate mode. FIG. 2 is discussed from the perspective that the method 200 is implemented and performed by the electronic device 105 of FIG. 1 to place the processor 100 into the hibernate mode.

At 210, Method 200 begins when the processor 100 receives a control signal requesting the processor 100 to transition to a hibernate mode from an on mode. The hibernate mode is a mode where the processor 100 consumes no power and can instantly return to the on mode and resume processing from the same point at which the processor 100 was operating prior to receiving the control signal to enter the hibernate mode. The hibernate mode is distinct from an off mode in that the processor 100 cannot instantly recover from the off mode. That is, to return to the on mode from the off mode, the processor 100 goes through a full boot sequence that is not required when recovering from the hibernate mode and also not necessary when recovering from the sleep mode. For example, a full boot sequence from the off mode consumes substantially more time than transitioning from the hibernate mode to the on mode since information related to various devices in the electronic device 105 and the operating system are newly loaded during a full boot sequence. The information for the device components and OS is newly loaded when recovering from the off mode because a previous state is not saved when the processor 100 is placed in the off mode, whereas the previous state is saved when placing the processor 100 in the hibernate mode or sleep mode.

At 220, after receiving the control signal to transition into the hibernate mode at 210, method 200 stores the current state of components of the processor 100 in a non-volatile memory. In one embodiment, the current state of the processor 100 is captured from registers in the processor 100. The registers include information used by the processor 100 for currently executing processes. In this way, the current state of the processor 100 is saved so that when the processor 100 is powered back on processing can resume substantially instantly without delays from a lengthy boot process. Furthermore, since the registers are saved to the non-volatile memory during the hibernate mode, power to the registers and any components used to maintain the registers can be eliminated. Thus, power consumption can be reduced and when the processor 100 is embodied in a battery powered device, battery life is prolonged. In one embodiment, values are saved to non-volatile memory for registers associated with, for example, a real-time clock (RTC) and an operating system timer (OST) of the processor. In further embodiments, fewer or additional values (e.g., GPIO values) may be saved to the non-volatile memory.

In addition to preserving the values of the registers, at 230 of method 200, contents of volatile memory associated with the processor 100 are preserved by controlling the volatile memory to initiate a self-refresh mode. In one embodiment, the volatile memory includes operating system data for an operating system that is executing on the processor 100 when the control signal is received. Thus, by controlling the volatile memory to enter the self-refresh mode the operating system data is preserved and does not need to be offloaded to non-volatile memory. Additionally, by using the self-refresh mode, data also does not need to be reloaded into volatile memory from non-volatile memory when the processor 100 is powered back on from the hibernate mode. In this way, the electronic device 105 can avoid lengthy boot sequences and/or memory loads by not having to completely power down to an off mode and instead can quickly wake up the processor and resume operating in an on mode. Additionally, by placing the volatile memory in self-refresh mode, a controller for the volatile memory may also be powered off.

With continued reference to FIG. 2, at 240, method 200 adjusts the power to the processor 100 to zero. In one embodiment, method 200 may reduce the power to zero by eliminating the core voltage to the processor 100. That is, all power to the processor 100 is shut off so that no power is consumed by the processor 100 or any of the internal components while in the hibernate mode or sleep mode. When the processor 100 is in the hibernate mode, another component (e.g., PMIC 150) that is not part of the processor is configured to maintain a counter or timer to update the stored values when the processor 100 is awakened from the hibernate mode.

Figure 3:
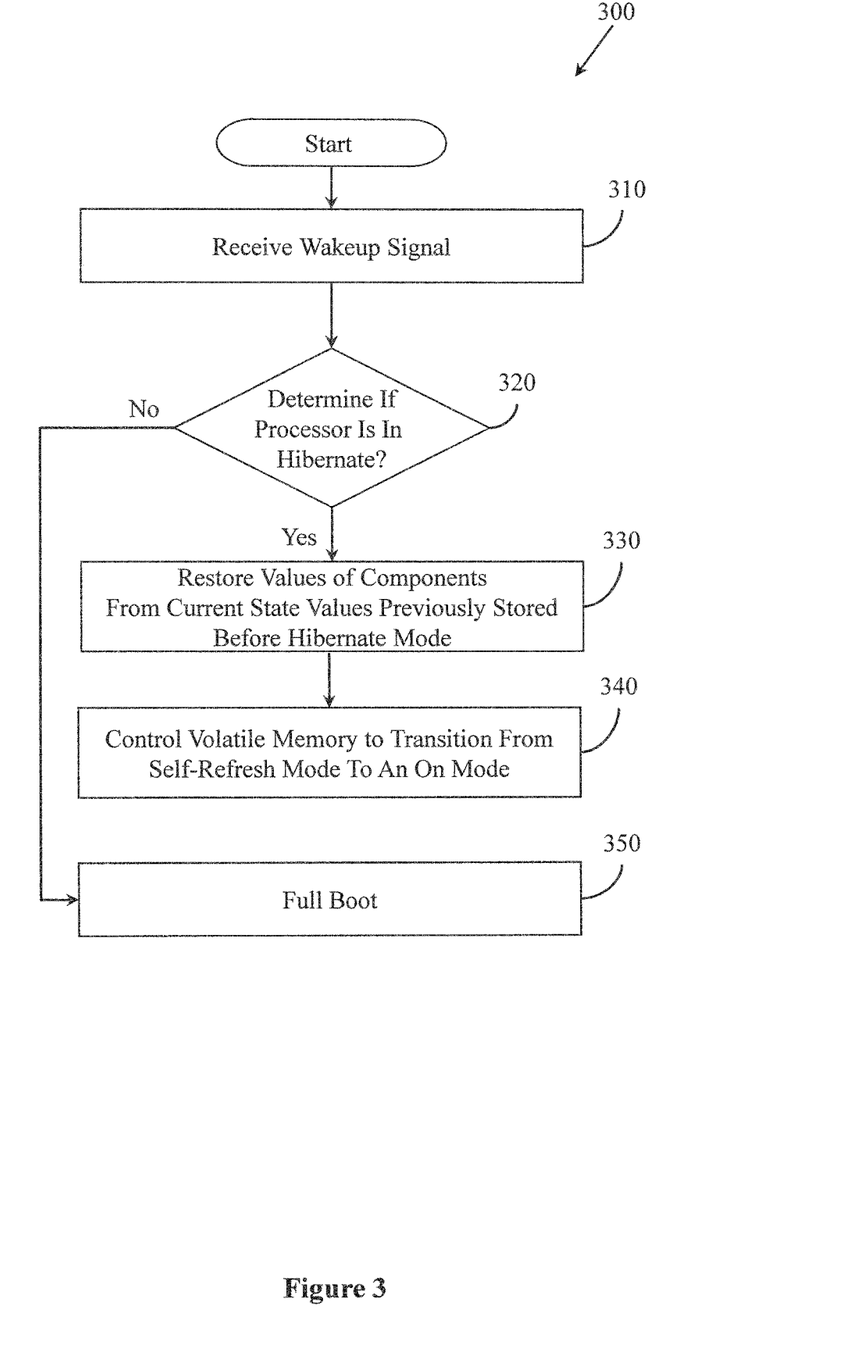
FIG. 3 illustrates one embodiment of a method associated with restoring a processor from a hibernate mode.

FIG. 3 illustrates a method 300 associated with restoring a processor from a hibernate mode. At 310, a signal is received to wakeup the processor 100 to an on mode. When received, the processor 100 may be in one of a number of modes: an off mode, a hibernate mode, or a sleep mode. In one embodiment, the wakeup signal is received in the PMIC 150. The PMIC 150 is configured to establish power to the processor 100 and then relay the wakeup signal to the processor 100. In another embodiment, the wakeup signal is a power on event in the processor 100 received, for example, via the GPIO 126, or via another logic configured to receive the wakeup signal.

At 320, after receiving the wakeup signal, method 300 determines whether the processor 100 is waking up from hibernate mode or the off mode. If, at 320, method 300 determines that the processor 100 is waking up from the off mode then the method 300 proceeds to 350 where the processor 100 executes a full boot sequence where the operating system and information for components of the processor 100 is newly loaded.

However, if, at 320, method 300 determines that the processor 100 is waking up from the hibernate mode, then method 300 proceeds to 330. In one embodiment, to determine whether the processor 100 is in the hibernate mode or the off mode, method 300 checks a current operating state of a volatile memory associated with the processor 100. For example, if the volatile memory is turned off and not in a self-refresh mode, then the processor 100 was in the off mode and method 300 proceeds to 350. However, if the volatile memory is in a self-refresh mode, then the processor 100 is in the hibernate mode and method 300 proceeds to 330. In further embodiments, if the volatile memory is in an off mode, an additional check is made to determine if the volatile memory was powered off during, for example, a sleep mode. If the volatile memory was powered off during a sleep mode then the volatile memory is reloaded with stored data and the method continues to 330 or controls the volatile memory to be reloaded at 340.

At 330, method 300 restores values of components of the processor 100 that were previously stored in non-volatile memory. In one embodiment, the values are restored to registers in the processor 100 so that the values are the same as before the hibernate mode. In another embodiment, the values from the non-volatile memory are adjusted before being stored back in registers in the processor 100 to account for time that has lapsed while in the hibernate mode. For example, a value of a real-time clock of a circuit (e.g., PMIC 150) that is not powered off during the hibernate mode can be used to update the stored current state values in the non-volatile memory (e.g., RTC and OST values 135). The values from the non-volatile memory for the real-time clock of the processor 100 are updated by, for example, adding a value to the stored real-time clock value to ensure that a time represented by the real-time clock is correct. Other values besides the real-time clock may also be updated in a similar fashion. In this way, updated values can be generated for the processor 100 when recovering from the hibernate mode or sleep mode.

At 340, method 300 controls the volatile memory to transition from the self-refresh mode to an operating mode (e.g., on mode). In one embodiment, method 300 also restores operating system information to the processor 100 using a pointer to a location in the volatile memory. In this way, after method 300 is finished with 340, the processor 100 is restored from the hibernate mode and information that was previously stored in the processor is once again present in the processor 100 so that the processor 100 can seamlessly transition back to operating as it was before the processor entered the hibernate mode. It should be noted that in an embodiment where the volatile memory is also powered down, instead of using self-refresh mode, at 340, the contents of the volatile memory are copied back to the volatile memory from a storage location in non-volatile memory. Additionally, in one embodiment, the actions in 330 and 340 can occur in parallel or 340 may occur prior to 330.

Figure 4:
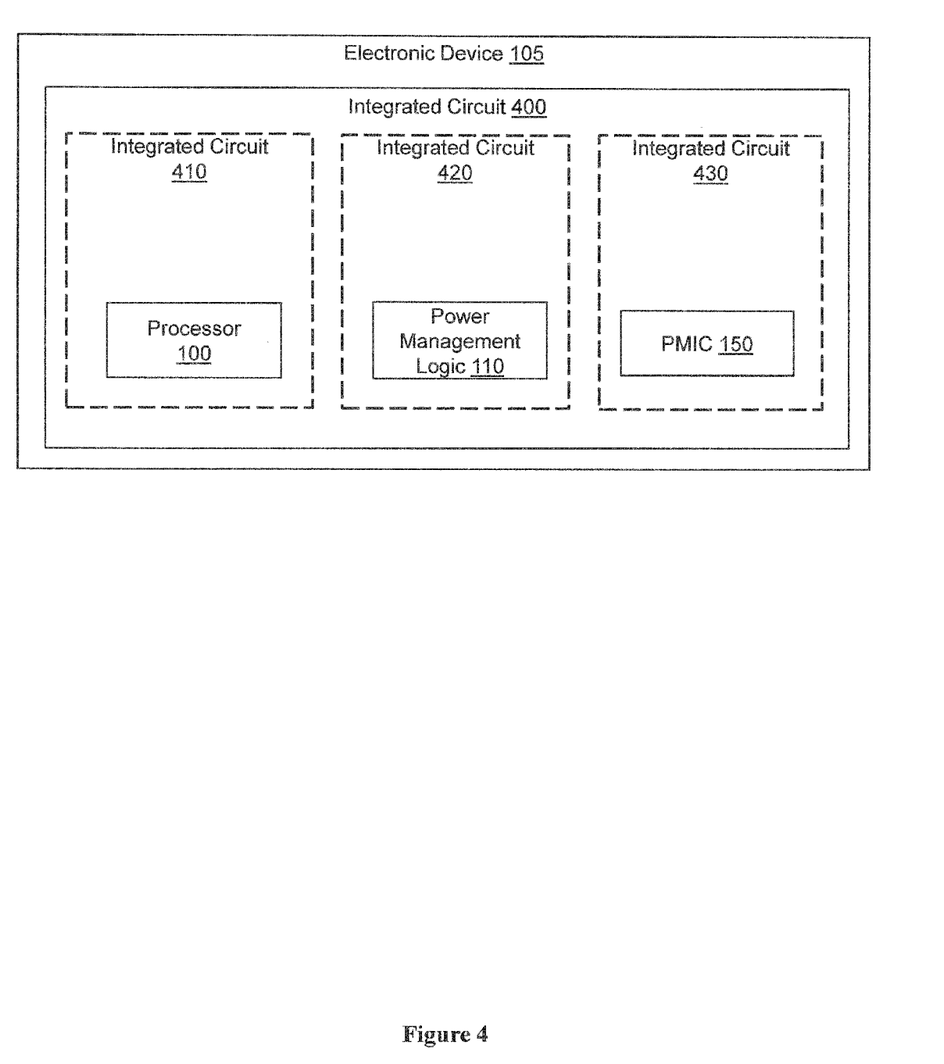
FIG. 4 illustrates one embodiment of an integrated circuit associated with a zero power hibernate mode.

FIG. 4 illustrates another embodiment of the electronic device 105 from FIG. 1 that is configured with separate integrated circuits and/or chips. In this embodiment, the processor 100 from FIG. 1 is embodied as a separate integrated circuit 410. Additionally, the power management logic 110 is embodied on an individual integrated circuit 420. The PMIC 150 is embodied on an individual integrated circuit 430. The circuits are connected via connection paths to communicate signals. While integrated circuits 410, 420, and 430 are illustrated as separate integrated circuits, they may be integrated into a common circuit board 400. Additionally, integrated circuits 410, and 420 may be combined into fewer integrated circuits or divided into more integrated circuits than illustrated.

In another embodiment, the power management logic 110 and the PMIC 150 illustrated in integrated circuits 420 and 430 may be combined into a separate application specific integrated circuit. In other embodiments, the functionality associated with the power management logic 110 may be embodied as firmware executable by a processor (e.g., processor 100).

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. A processor, comprising:
   power management logic configured to:
   receive a control signal requesting the processor to transition into a power saving mode that reduces power to the processor while retaining a current state of the processor;
   store, in response to the control signal, a current state of components of the processor in a non-volatile memory;
   adjust power to the processor to a zero power mode to place the processor into the power saving mode, wherein during the
   zero power mode the processor is receiving no power, wherein the power management logic is configured to control a
   volatile memory to initiate a self-refresh mode prior to adjusting the power in order to maintain data stored in the volatile
   memory while the processor is in the power saving mode; and restore the processor to an on mode if in the power saving mode by adjusting the stored current state of the components in the non-volatile memory to, generate an updated state which is different from the stored current state, and updating one or more resisters in the processor with the updated state.

2. The processor of claim 1, wherein the power management logic is configured to store a current state for each of a real-time clock (RTC) and an operating system timer (OST) of the processor by capturing values from registers in the processor and storing the values in the non-volatile memory.

3. The processor of claim 1, wherein the power management logic is configured to control the volatile memory to initiate the self-refresh mode by changing a state of the volatile memory to periodically refresh data in the volatile memory while powering off a controller of the volatile memory.

4. The processor of claim 1, wherein the processor is powered by a core voltage, wherein the power management logic is configured to adjust the power of the processor by reducing the core voltage of the processor during the zero power mode to zero volts, wherein the processor consumes zero power in the zero power mode, wherein the power management logic is configured to transition the processor into an on mode from the zero power mode in less than ten milliseconds, and wherein the power management logic is configured to transition the processor into the zero power mode from the on mode in less than ten milliseconds.

5. The processor of claim 1, wherein the power management logic is further configured to:
   receive a wakeup signal to change a power mode of the processor to an on mode; and
   determine, in response to the wakeup signal, whether the processor is in the power saving mode or an off mode by checking a current operating state of the volatile memory to determine whether the volatile memory is in the self-refresh mode.

6. The processor of claim 5, wherein the power management logic is configured to restore the processor to the on mode by re-establishing power to the processor, and
   wherein adjusting the stored current state includes using a value of a real-time clock of a power management integrated circuit (PMIC) to update the stored current state to the updated state.

7. The processor of claim 5, wherein the power management logic is configured to control, in response to the wakeup signal, a volatile memory to transition from a self-refresh mode to an operating mode and to restore operating system information to the processor using a pointer to a location in the volatile memory.

8. A method, comprising:
receiving, in a processor, a control signal requesting the processor to transition into a power saving mode that reduces power to the processor while retaining a current state of the processor;
storing, in response to the control signal, a current state of components of the processor in a non-volatile memory;
controlling a volatile memory associated with the processor to initiate a self-refresh mode to maintain data stored in the volatile memory while the processor is in the power saving mode;
adjusting power to the processor to a zero power mode to place the processor into the power saving mode, wherein during the zero power mode the processor is receiving no power, and
restoring the processor to an on mode if in the power saving mode by adjusting the stored current state of the components in the non-volatile memory to, generate an updated state which is different from the stored current state, and updating one or more resisters in the processor with the updated state.

9. The method of claim 8, wherein storing the current state of the components includes storing a current state for each of: a real-time clock (RTC) and an operating system timer (OST) of the processor.

10. The method of claim 8,
wherein controlling the volatile memory associated with the processor to initiate the self-refresh mode includes changing a state of the volatile memory to periodically refresh data in the volatile memory while powering off a controller of the volatile memory.

11. The method of claim 8, wherein the processor is powered by a core voltage, and wherein adjusting the power of the processor includes reducing the core voltage of the processor during the zero power mode to zero volts.

12. The method of claim 8, further comprising:
receiving a wakeup signal to change a mode of the processor to an on mode;
determining, in response to the wakeup signal, whether the processor is in the power saving mode or an off mode by checking a current operating state of the volatile memory to determine whether the volatile memory is in the self-refresh mode.

13. The method of claim 12, wherein restoring the processor to the on mode includes re-establishing power to the processor, and wherein adjusting the stored current state of the components includes using a value of a real-time clock of a power management integrated circuit (PMIC) to update the stored current state to the updated state.

14. The method of claim 12, further comprising:
controlling, in response to the wakeup signal, a volatile memory to transition from a self-refresh mode to an operating mode and to restore operating system information to the processor using a pointer to a location in the volatile memory.

15. An integrated circuit comprising:
power management logic configured to control a processor to transition into a power saving mode that reduces power to the processor while retaining a current state of the processor by: saving the current state of the processor to a non-volatile memory;
and
reducing power to the processor to place the processor into the power saving mode, wherein during the power saving mode the processor is consuming no power,
wherein the power management logic is configured to control a volatile memory to initiate a self-refresh mode prior to reducing the power in order to maintain data stored in the volatile memory while the processor is in the power saving mode;
wherein the power management logic is configured to restore the processor to an on mode if in the power saving mode by adjusting the saved current state of the components in the non-volatile memory to generate an updated state which is different from the saved current state, and updating one or more registers in the processor with the updated state.

16. The integrated circuit of claim 15, wherein the power management logic is configured to save a current state for each of a real-time clock (RTC) and an operating system timer (OST) of the processor by capturing values from registers in the processor and storing the values in the non-volatile memory.

17. The integrated circuit of claim 15, wherein the power management logic is configured to control the volatile memory to initiate the self-refresh mode by changing a state of the volatile memory to periodically refresh data in the volatile memory while powering off a controller of the volatile memory.

18. The integrated circuit of claim 15, wherein the processor is powered by a core voltage, and wherein the power management logic is configured to reduce the power of the processor by reducing the core voltage of the processor to zero volts.

19. The integrated circuit of claim 15, wherein the power management logic is further configured to:
receive a wakeup signal to change a power mode of the processor to an on mode;
determine, in response to the wakeup signal, whether the processor is in the power saving mode or an off mode by checking a current operating state of the volatile memory to determine whether the volatile memory is in the self-refresh mode.

20. The integrated circuit of claim 19, wherein the power management logic is configured to restore the processor to the on mode by re-establishing power to the processor,
wherein adjusting the stored current state includes using a value of a real-time clock of a power management integrated circuit (PMIC) to update the saved current state to the updated state, and
wherein the power management logic is configured to control, in response to the wakeup signal, a volatile memory to transition from a self-refresh mode to an operating mode and to restore operating system information to the processor using a pointer to a location in the volatile memory.

* * * * *